United States Patent [19]

Kemerer et al.

[11] Patent Number: 5,244,618
[45] Date of Patent: Sep. 14, 1993

[54] PROCESS AND APPARATUS FOR CONTINUOUS THREE-DIMENSIONAL FORMING OF HEATED THERMOPLASTIC MATERIALS

[75] Inventors: W. James Kemerer, Mission Viejo; Clyde W. Vassar, Del Mar, both of Calif.

[73] Assignee: Kemcast Partners-1989, Mission Viejo, Calif.

[21] Appl. No.: 843,362

[22] Filed: Feb. 25, 1992

Related U.S. Application Data

[62] Division of Ser. No. 506,072, Apr. 6, 1990, Pat. No. 5,167,781.

[51] Int. Cl.⁵ .............................................. B29C 39/16
[52] U.S. Cl. .................................. 264/166; 264/40.5; 264/40.6; 264/167; 264/175; 264/214; 264/310; 264/313; 264/348; 425/135; 425/144; 425/327; 425/371; 425/395; 425/DIG. 2; 425/DIG. 55
[58] Field of Search .................. 425/327, 371, DIG. 2, 425/DIG. 55, 150, 144, 135, 335, 439, 449, 385, 395; 264/166, 167, 555, 175, 177.1, 40.5, 297.3, 40.6, 297.6, 214, 310, 313, 348, 323

[56] References Cited

U.S. PATENT DOCUMENTS

| | | | |
|---|---|---|---|
| 3,066,351 | 12/1962 | Schriner | 425/DIG. 44 |
| 3,399,427 | 9/1968 | Harp, Jr. | 425/327 |
| 3,422,178 | 1/1969 | Junker et al. | 425/150 |
| 3,470,286 | 9/1969 | Weber | 425/327 |
| 3,594,461 | 7/1971 | Jacob | 425/371 |
| 3,605,194 | 9/1971 | Nauta | 156/582 |
| 3,674,388 | 7/1972 | Heilmayer | 425/72 |
| 3,746,487 | 7/1973 | Andrews | 425/371 |
| 3,824,057 | 7/1974 | Kornylak et al. | 425/371 |
| 3,852,387 | 12/1974 | Bortnick et al. | 264/210 |
| 3,885,009 | 5/1975 | Rivat-Lahousse | 425/371 |
| 3,895,087 | 7/1975 | Ottinger | 52/314 |
| 3,897,667 | 8/1975 | Turck | 52/314 |
| 3,914,084 | 10/1975 | Kornylak | 425/371 |
| 3,933,964 | 1/1976 | Brooks | 264/171 |
| 3,945,789 | 3/1976 | Boman | 425/371 |
| 3,981,663 | 9/1976 | Lupke | 425/371 |
| 4,004,870 | 1/1977 | Guttinger et al. | 425/371 |
| 4,017,245 | 4/1977 | Lang | 425/371 |
| 4,043,732 | 8/1977 | Ahrweiler | 425/371 |
| 4,128,369 | 12/1978 | Kemerer et al. | 425/327 |
| 4,278,624 | 7/1981 | Kornylak | 425/DIG. 2 |
| 4,290,248 | 9/1981 | Kemerer et al. | 52/309.16 |
| 4,956,140 | 9/1990 | Rolles et al. | 264/323 |

FOREIGN PATENT DOCUMENTS 3312856  10/1984  Fed. Rep. of Germany ...... 425/371

Primary Examiner—Jeffery Thurlow
Assistant Examiner—Mathieu Vargot
Attorney, Agent, or Firm—Parmelee, Bollinger & Bramblett

[57] ABSTRACT

Continuous process and apparatus form products from thermoplastic materials between top and bottom mold carriages. A flexible silicone rubber mold on a fiber belt continuously moves around each carriage frame. A surface of desired shape on one rubber mold mates with the desired shape of an opposed rubber mold forming a continuously moving mold channel into which is fed hot thermoplastic material at moldable temperature. After discharging the molded plastic product from the moving mold channel, localized surface heat in the molds resulting from contact with hot plastic is removed from the belt molds by air blown onto mold surfaces. Each carriage frame includes a back-up plate coated with low friction coefficient material over which slides a continuously moving belt mold. These slippery plates have numerous air-bearing holes feeding high pressure air between them and the respective moving fiber belt for reducing friction and wear. The fiber belts are guided and driven by a wide, central V-shaped toothed ridge or by twin, wide V-shaped toothed ridges along belt margins. These ridges fit into and mesh with corresponding toothed grooves of sprocket drive rolls, serving to maintain alignment of revolving mold belts. An electric drive motor, with or without torque-motor assistance, revolves both belt molds in unison maintaining their mating alignment. Electric screw jacks raise the top carriage, extend/retract grooved exit rolls, fine-tune alignment of revolving belt molds by adjusting grooved exit rolls and adjust the machine relative to the extruder.

17 Claims, 6 Drawing Sheets

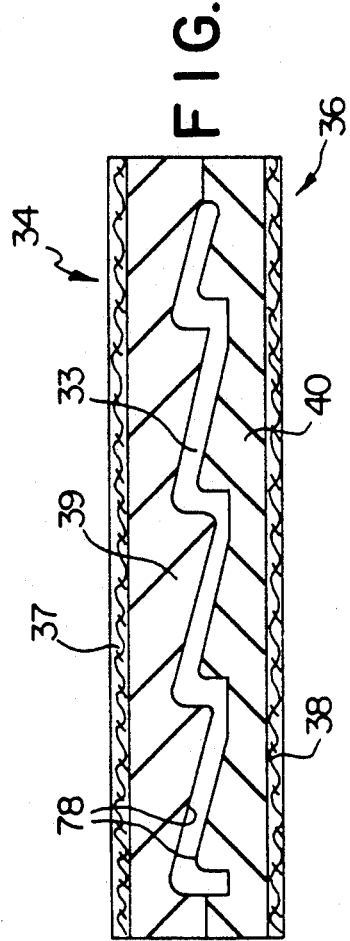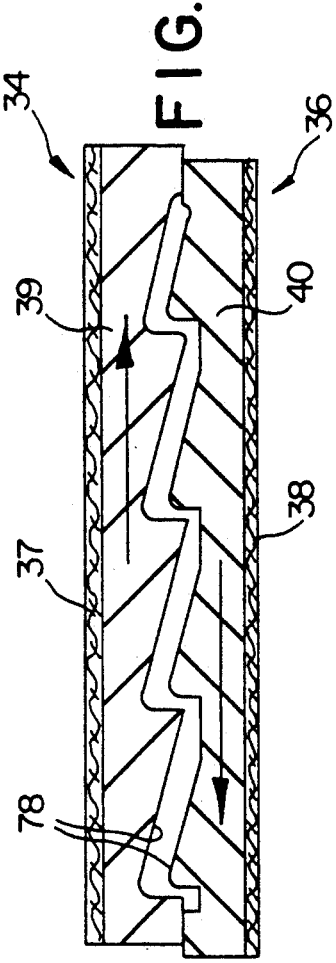

PROCESS AND APPARATUS FOR CONTINUOUS THREE-DIMENSIONAL FORMING OF HEATED THERMOPLASTIC MATERIALS

This application is a division of application Ser. No. 07/506,072, filed Apr. 6, 1990, now U.S. Pat. No. 5,167,781.

FIELD OF THE INVENTION

The present invention relates generally to plastics molding and more particularly to a continuous process and apparatus for forming products from thermoplastic materials between top and bottom mold carriages. Each carriage has a frame including a backup plate coated with a low coefficient of friction material over which slides a continuously moving belt mold. The belt mold is comprised of a silicone rubber mold adhered to a fiber belt. The silicone rubber mold has a surface of desired shape for with an opposed mold surface to form a continuously moving mold channel into which is fed moldable thermoplastic material. After molding and cooling the hot plastic material, localized surface heat of the belt molds is removed as the belts return to the entry end of the machine through ducts of cold air moving in the opposite direction.

BACKGROUND OF THE INVENTION

An apparatus and process for forming products from thermoplastic polymeric material having three-dimensional patterns and surface textures is disclosed in U.S. Pat. Nos. 4,128,369 and 4,290,248, both of which are hereby incorporated by reference.

In the apparatus and process disclosed in said patents a thermoplastic material to be formed is heated above its glass transition temperature before introduction between travelling flexible belt molds, which revolve in opposed relationship. The flexible belt molds each include a thin, flexible sheet-metal belt of relative high thermal conductivity and form a traveling mold channel, at least one having a flexible three-dimensional pattern formed on its front face. Opposed nip rolls press the revolving belt molds against the entering thermoplastic material. At least one belt mold travels partially around the nip roll and impresses its three-dimensional pattern into the heated plastic material in a progressive localized rolling, squeezing action in the nip region. Thereafter, a series of backup rolls along the mold channel hold the traveling belt molds against the impressed material for maintaining the impression while being cooled by liquid coolant into the memory-retention state. A cooling liquid, mainly water at room temperature, is moved along the backup rolls and applied to the back surface (inside surface) of each thermal conductive steel belt for cooling each belt mold. After the plastic material has been sufficiently cooled to retain three-dimensional patterns, the flexible belt molds are separated from it. Large area architectural panels can be produced. Belt molds are shown as including wide, thin, endless, flexible metal belts, at least two-feet wide, having a wide flexible mold formed of a heat-resistant material, such as rubber, bonded to the metal belt.

The prior disclosed apparatus utilizes thin steel belts which revolve upon large flat surface drive pulleys. Steel belts suffer from the inherent problems of being susceptible to dents, crimped edges, and rust. They also require a weld seam. Steel belts present difficulties in the maintenance of alignment as they travel over flat surfaced metal pulleys.

Steel belts are susceptible to denting, crimping, rusting, and camber because they are extremely thin, being typically 0.025 to 0.075 of an inch thick. The use of such extremely thin steel belts in an industrial environment increases the probability of incurring damage thereto.

The use of a metal belt requires that the drive pulleys be comparatively large because the metal belt cannot be made to continuously travel over small-diameter pulleys. Small pulleys cause bend-yield-stress elongation of thin metal belts. Thus, the drive pulleys in the prior disclosed apparatus must be fabricated of a sufficient diameter to accommodate the metal belt and consequently the drive pulleys occupy a substantial amount of space within the disclosed machine. Thus, the space available for cooling and other apparatus is strictly limited.

A weld seam is required in the formation of an endless-loop metal belt. An elongate planar sheet of metal is looped about itself and welded together to form the belt, thus forming a weld seam. The formation of such an endless-loop metal belt, without damaging it, is necessarily a time-consuming and somewhat difficult task. The weld seam should be made to keep the belt edges parallel to each other and be ground flush to prevent distortion of the flexible rubber mold which is to be subsequently formed on the outer surface of the welded planar metal belt.

Further difficulties in the maintenance and alignment of the metal belt of the apparatus disclosed in said patents occur because the metal belt is installed upon flat pulleys which lack any self-aligning characteristics.

Sixty or more small-diameter rollers function to maintain the two travelling mold surfaces of the prior art apparatus in close contact. The small-diameter steel rollers rotate continuously and are continuously exposed to the liquid coolant, which is comprised mainly of water. They ar subject to frequent malfunction and require periodic maintenance. Also, the use of such numerous small-diameter rollers does not facilitate maximum intimate contact of the opposing travelling mold surfaces because of the many gaps inherently formed between such rollers. The multiplicity of these steel rolls causes the travelling flexible molds to experience considerable fluctuations in contact pressures as they successively travel over roller-gap-roller-gap-roller, etc.

In the prior disclosed apparatus, an offset is formed between the inside edge of the exit rollers and the path of the molded product to help strip the belt molds from the molded product. That is, the circumference of each exit roller is not tangential to the plane of one surface of the molded product path, but rather the bottom roll is downward and the upper roll is upward away from the molded product path, in order to help separate the belt molds from the molded product. This offset reduces the support provided to the molded product, thereby requiring that the molded product be sufficiently cooled and rigid to resist deformation prior to passing between the exit rollers.

The prior disclosed apparatus utilizes hydraulic actuators to tension the mold belts, provide a compressive force to maintain contact of the two opposing mold belts, and to lift the upper mold assembly off of the lower mold assembly to facilitate maintenance and the changing of mold belts.

As is well known in the art, hydraulic actuators require the use of a motor, pump, various hoses and valves, and actuator cylinders. The hydraulic system must be maintained in a leak-free condition in order to function properly and prevent contamination of the molded product. Hydraulic systems constantly consume electrical energy when the apparatus is operative. That is, the hydraulic motor and pump must constantly be running in order to provide pressure to maintain and change position of the hydraulic actuators. The motor and hydraulic pump are inherently noisy and commonly located in close proximity to the apparatus. This makes the working environment of the apparatus extremely uncomfortable and contributes to an unsafe and unhealthy working environment.

The prior art discloses an apparatus and process that primarily removes the heat of the hot plastic by moving cold water along the small diameter backup rolls against the backside of the thin steel belts. This back-surface water cooling method proves inefficient because the heat of the plastic must first pass through the thick low thermal conductive silicone mold on at least one belt mold. The silicone mold material has a low thermal conductivity with a K factor of about 0.10 compared with the mild carbon steel which has a K factor of about 26.0. The K factor values for the materials are expressed in units of BTU per hour through a square foot per degree Fahrenheit of temperature difference per foot.

In addition to the difficulty of removing the heat of the plastic through the low thermal conductive silicone, this prior art back-surface method of cooling did not provide the means to control the temperature of the belt molds. It is desirable for good molding conditions to have the belt molds consistently at about the same temperature as the molds first contact the hot plastic each time they return to the entry end.

The back-side fluid cooling method also involves a water sump under the machine; a water cleaning system; water chillers or water cooling tower; and a water recirculating system. This equipment needs constant maintenance, causes high humidity in the work place, and increases the cost of operating the machine.

Therefore, the prior disclosed apparatus and process has a variety of deficiencies which detract from its effectiveness, efficiency, and marketability. In view of the shortcomings of the prior disclosed apparatus, it is desirable to provide an apparatus and process which does not utilize thin steel belts and consequently is not susceptible to crimps and dents; does not have weld seams; is not susceptible to rust and camber; and does not have difficulties in the maintenance of alignment as it travels over flat surfaced pulleys. It would be desirable to provide an apparatus with belt molds that can include a ridge and a gear or cog arrangement that will fit and mesh with a matching grooved drive roll sprocket as a means of maintaining mechanical alignment, both laterally and in the forward motion feeding direction. It would also be desirable to provide an apparatus which does not use a plurality of small-diameter rollers to maintain intimate contact of the upper and lower belt molds. These rolls require periodic maintenance as they are subject to the effects of wear due to friction and to exposure to the coolant water being applied to the steel belts.

Further, it would be desirable to provide an apparatus which uses small-diameter entrance and exit rollers to reduce the length of the mold belts required, increase the space available for cooling and other equipment, and reduce the size and cost of the machine as a whole.

Further, it would be desirable to provide an apparatus which does not require the use of hydraulic actuators and consequently would eliminate the need for a motor, pump, various hoses and valves, and actuator cylinders, as well as the requirements for maintaining these items in a leak-free state. It would also be desirable to provide an apparatus which operates quietly and does not constantly consume electrical energy.

Further, it would be desirable to provide an apparatus which does not utilize an offset between the exit rollers and the plane of the product path so that support is continuously provided to the molded product as it travels the length of the machine onto the product conveyors.

Further, it would be desirable to provide an improved means and apparatus to remove the heat from the surface of the silicone molds. Extracting the heat through the silicone and the steel belt backing with cold water moving against the thin steel backing is an inefficient exchange of heat and limits production rates. Further, it improves the molding operation if the heat of the belt as it first contacts the hot plastic is controlled. This can be accomplished by controlling the cooling of the belt molds through a series of dampers in the cold air ducts that provide the means to vary the temperature of the molds by varying the amount of chilled air blowing on the belt molds as well as the ability to control when the belt molds will be cooled on their return to the entry end of the machine.

SUMMARY OF THE DISCLOSURE

The following description and drawings disclose a new, improved process and apparatus for the continuous forming of products from thermoplastic polymeric material having three-dimensional patterns and surface textures.

The process and apparatus described in U.S. Pat. Nos. 4,290,248 and 4,128,369 was disclosed eleven and thirteen years, respectively, prior to this application. Since then much has been learned, product design specifications have become more demanding, and new technology has become available. The apparatus and process embodying the present invention produce a molded plastic product having closer tolerances on a less-costly machine. The machine is easier to maintain, uses less energy, is less expensive to operate, and is quieter in operation.

The present invention specifically addresses and alleviates the above-mentioned deficiencies associated in the prior art. More particularly, the present invention provides a continuous process and apparatus for forming products from thermoplastic materials between top and bottom mold carriages.

Each carriage has a frame including a backup plate coated with a low coefficient of friction material over which slides a continuously moving belt mold. The belt mold is comprised of a silicone rubber mold adhered to a multi-ply woven fabric belt made of non-metallic fibers. The silicone rubber mold has a surface of desired shape for mating with an opposed mold surface to form a continuously moving mold channel into which is fed moldable thermoplastic material.

After molding the hot plastic material, surface heat localized in the surfaces of the belt molds is removed by cold air blowing from one or more air conditioning units directly onto the mold surfaces, preferably at temperatures about 35° F. to about 50° F. The cold air is directed by a series of dampers in the air ducts to blow counter to the direction the belt molds are travelling and to cool the belt molds as desired in certain zones of their return to the entry end.

The low coefficient of friction backup plates have numerous air-bearing holes for feeding high-pressure air between the low coefficient of friction plates and the moving fiber belt to provide an air-bearing effect to reduce contact pressure and friction.

The fiber belts are guided and driven by a wide V-shaped central ridge or by twin V-shaped wide ridges near their edges. The V-shaped ridges fit into and mesh with corresponding grooves of the sprocket drive rolls and operate to drive the belts and to maintain alignment of the belt molds. An electric drive motor, with or without the assistance of a torque motor, drives both belt molds in unison to maintain their relative alignment. Electric screw jacks raise the top carriage, extend or retract the grooved exit rolls, and fine-tune the alignment of the moving belt molds by adjusting the grooved exit rolls.

The use of fabric belts eliminates weld seams, crimps, dents, and rust. The use of fabric belts also eliminates many of the alignment problems associated with the prior art steel belts. Additionally, the use of fabric belts permits the use of smaller diameter pulleys, thus providing more room for cooling and other equipment. The use of smaller diameter pulleys also reduces th required length of the mold belts.

The use of a low coefficient of friction backup plate with air bearings eliminates the requirement for a plurality of small-diameter rollers. The backup plates stabilize the flexible travelling mold channel in height, configuration, and orientation, and provide belt contact pressure consistently as the flexible belt molds travel from the entry to the exit end of the machine. In addition, the associated problems of wear due to friction, the significant manufacturing costs, and the associated maintenance requirements are likewise eliminated.

The screw jacks used in the machine embodying the present invention operate quietly, consume power only when being used, and provide precision positioning of the moved parts. The screw jacks thus eliminate the problems associated with the prior art use of hydraulic actuators which require a motor, pump, various hoses and valves, and actuator cylinders; must be maintained in a leak-free state; operate loudly; and constantly use energy when running.

The use of small drive rolls, instead of the larger pulleys required by the use of steel belts in the prior art, makes it possible to construct a machine incorporating the present invention in a simpler and less expensive manner. The use of smaller diameter rolls makes maintenance and handling of the upper carriage substantially easier; provides room for cooling apparatus; and reduces the required length of the mold belt.

In a machine embodying the present invention, the exit rolls are mounted in the same plane as the plane of the molded product and thus provide support to the molded product as it passes between the exit rolls to the product conveyor.

The exit rolls in a machine that embodies the present invention may also be crowned to aid in alignment of the fabric belt, thus simplifying maintenance and operation.

Air cooling is effective due to the use of counter-current-flow and a fabric belt. The use of counter-current-flow provides maximum heat exchange between the heated mold surface and the cooling air. The fabric base, has a low heat capacity and low thermal conductivity similar to the silicone molds. It therefore operates to keep the heat absorbed from the hot plastic near the surface of the belt mold where it may be readily extracted by cold air directly impinging against the mold surfaces.

The process steps and apparatus components that are improved, and the means of achieving the desired improvements, are shown and described as follows.

BRIEF DESCRIPTION OF THE DRAWINGS

FIG. 9 is a partial cross-sectional view through a pair of opposed fiber belt molds which are properly aligned; and FIG. 10 is a view similar to FIG. 9 for showing how the product is deformed, when the fiber belt molds are not properly aligned.

DETAILED DESCRIPTION OF THE PREFERRED EMBODIMENT

The new, improved process and apparatus for the continuous forming of products from thermoplastic polymeric material will now be described in detail with reference to the drawings. The same reference numbers are used in the various views to indicate the same components of the apparatus. Alternative embodiments of components of this apparatus are described and shown.

FRAME

Figure 1:
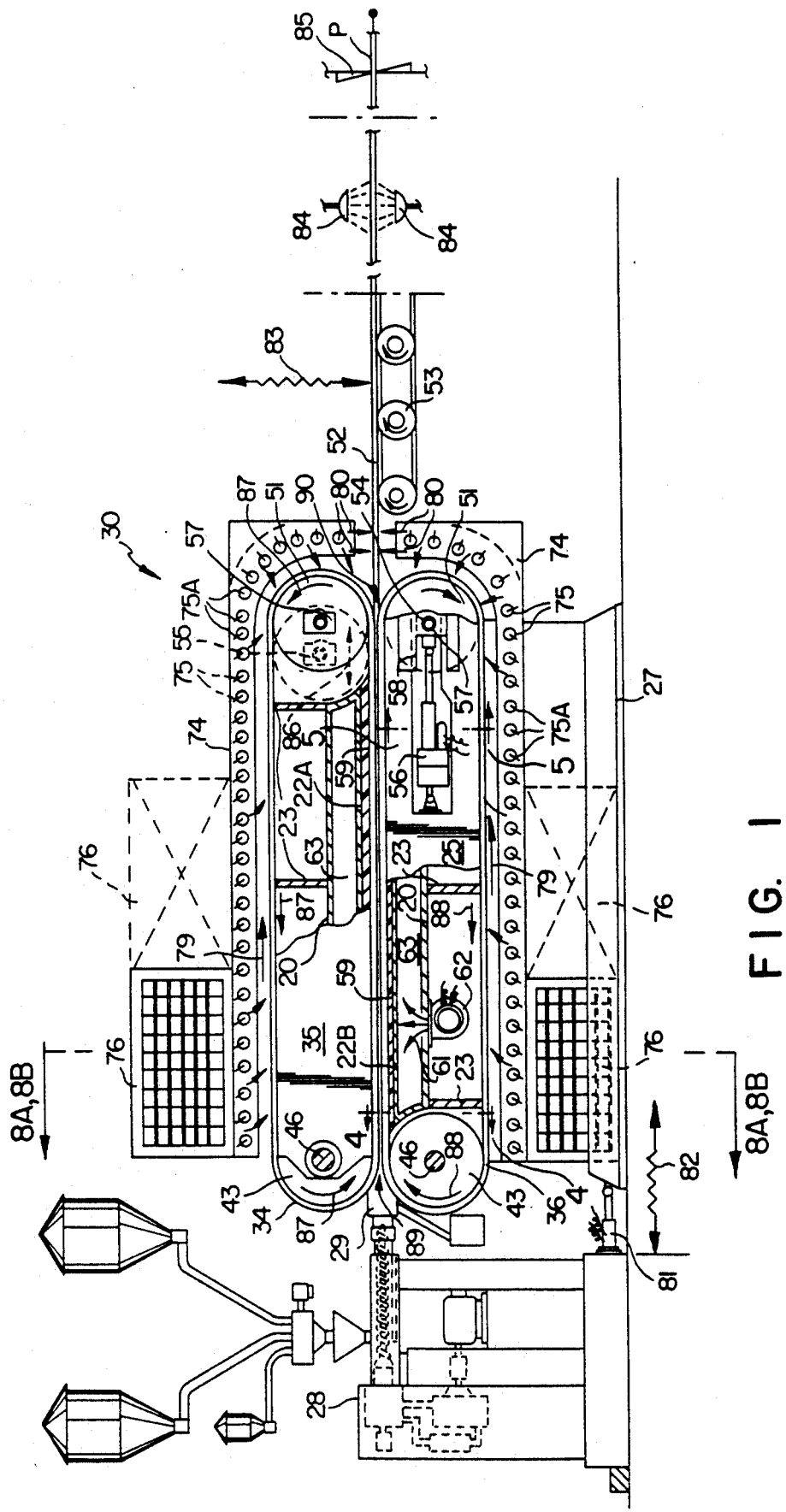
FIG. 1 is an elevational view of the new, improved apparatus for the continuous forming of products from thermoplastic polymeric material, with certain parts being shown in section.

Referring now to FIGS. 1–3, 7, 8A, and 8B, a metal frame 20 (FIGS. 1 and 8A) is comprised of steel side plates 21 (shown in FIG. 8A), backup plates 22 (FIGS. 1, 2, 3, and 7), and cross-bracing members 23 (FIG. 1). The motors 48 and 48A, wide sprocket drive rolls 43, backup plates 22, grooved exit rolls 51, air conditioners 76, and other auxiliary equipment are mounted to this frame. The sides of the frame 20 may have lightening holes (not shown) to reduce their weight and provide easy access to wiring and miscellaneous mechanical and electrical equipment mounted inside the frame 20.

The frame 20 that forms the sides 21 of the bottom carriage 25 (FIGS. 1, 8A, and 8B) is joined at the top by the bottom backup plate 22B (FIGS. 2, 3, and 7) and cross-bracing members 23 (FIG. 1). The bottom backup plate 22B and cross-bracing members 23 act as transverse stiffening webs which greatly stiffen the frame 20 of the bottom carriage 25. Similarly there is stiffening of the frame 20 of the top carriage 35, to be described later, so that their side plates 21 (FIG. 8A) can be thinner than otherwise. One side of the bottom carriage 25 is joined to two (only one is seen in FIG. 8A) vertical rectangular tubings 24 (FIGS. 8A and 8B) which are anchored onto a heavy metal floor base 26 (FIGS. 8A and 8B). The floor base 26 may be fitted longitudinally with inverted angle irons 27 (FIGS. 8A and 8B), V wheels, or similar means of sliding or rolling the machine 30 (FIG. 1) away from the extruder 28 (FIG. 1) to allow space to provide extruder or mixer maintenance and to change extruder dies 29 (FIGS. 1 and 2).

Figure 2:
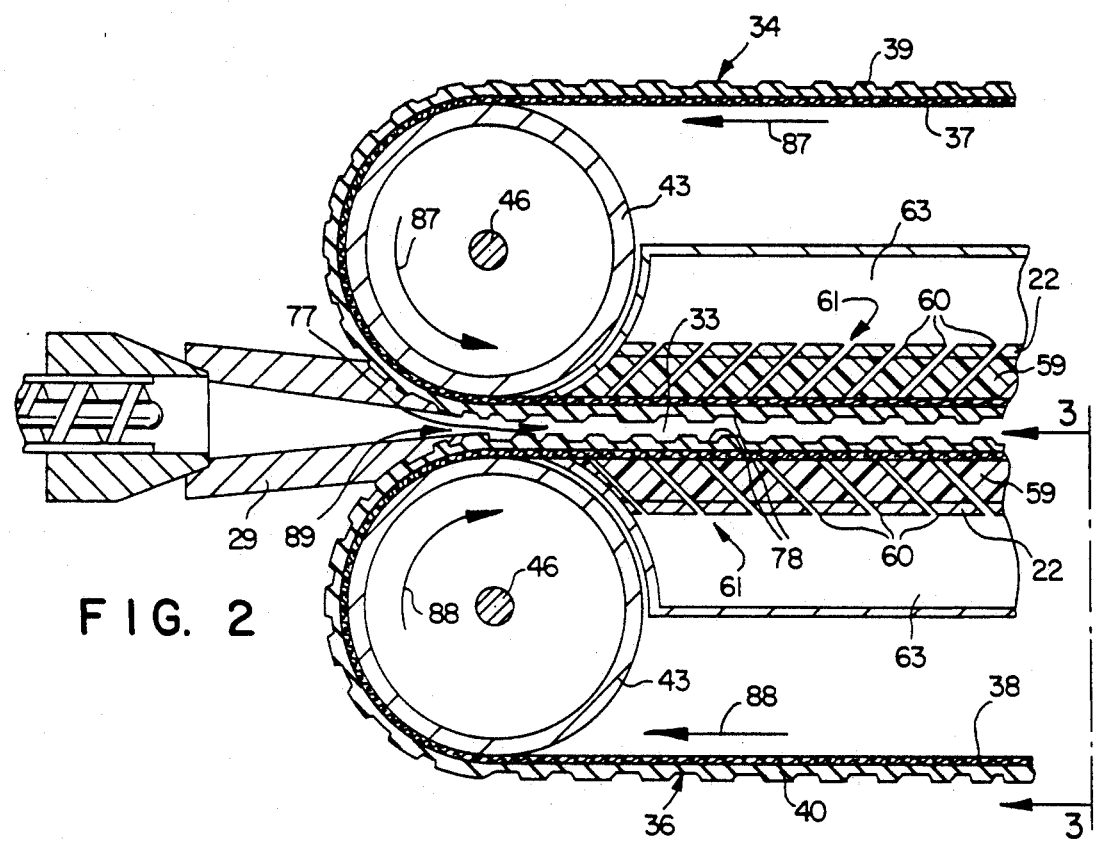
FIG. 2 is an enlarged partial elevational sectional view of the input or front end of the apparatus shown in FIG. 1.

In operation, the machine position is adjusted as close as necessary to the extruder feeding die 29 (FIGS. 1 and 2) to provide the belt molds 34 and 36 with the melted plastic feed stock 77 (FIGS. 2 and 8B). The heated melted thermoplastic material is moldable. If the product is to contain foamed plastic, the foamed plastic being fed from the extruder feeding die 29 (FIGS. 1 and is at an early stage of its foaming action to control finished product density and to produce a quality product.

The frame 20 (FIGS. 1 and 8A) that forms the sides of the top carriage 35 (FIGS. 1, 8A, and 8B) is stiffened by joining its sides 21 at the bottom by the top backup plate 22A (FIGS. 1 and 2) and cross-bracing members 23 (FIG. 1). One side of the top carriage 35 has two (only one is seen) vertical slides 31 (FIG. 8A) that are housed inside the two vertical rectangular tubings 24 (FIGS. 8A and 8B). The top carriage can be raised by electrical screw jacks 32 (FIG. 8A) up about eight inches from its lowest position in which the top carriage 35 (FIG. 1) is resting against the bottom carriage 25 (FIG. 1) or against set pins on the sides 21 of the bottom carriage 25.

It is necessary to raise the top carriage 35 to change the belt molds 34 and 36 as required to produce a product of a different design or pattern. The top carriage 35 is held in a raised, cantilevered position by the slides 3 (FIG. 8A) held inside the two vertical tubings 24 anchored to the floor base 26. The top carriage 35 is lowered to bring the top and bottom belt molds 34 and 36 (FIGS. 1 and 8B) together to form the mold channel 33 FIG. 8B) in which the melted plastic is formed, cooled, and set.

The wide rectangular air-bearing chambers 63 (FIGS. 1, 2, 3, and 7), described later, which extend the length of the top and bottom carriages 35 and 25, respectively, as shown in FIG. 1 act as strong, wide rectangular box beams which resist deflection and distortion of the mold carriages 35 and 25. The side plates 21 can be less massive than otherwise, because of the stiffening action of these air-bearing chambers 63.

On a machine embodying the present invention, as depicted in FIG. 1, fiber belts 37 and 38 are cooled by removing surface heat from the mold surfaces 78 (FIG. 8B) of the top 39 and bottom 40 molds with cold air while the surfaces of molds 39 and 40 are moving adjacent to chilled air in ducts 74. Such cold air 79 is being blown in a direction counter to the moving belt molds as the belt molds are returning from the exit end of the machine to the entry end, as will be explained in detail later.

Electrical screw jacks 56 provide positive and precise movement of the top carriage 35 and of the grooved exit rolls 51. Screw jacks are preferred to the prior art use of hydraulic jacks, since screw jacks only consume electrical power when they are being used to effect a change in position. Hydraulic jacks, on the other hand, constantly consume power merely to maintain position since a hydraulic pump must constantly be driven by a constantly running electric motor.

The top carriage slide 31 provides a simple, perpendicular mating fit of the upper 34 and lower 36 belt molds and operates to open with a straight, vertical lift rather than in a clam shell fashion as occurs in the prior disclosed apparatus.

The molded product 52 is further cooled as necessary by passing through a water bath or spray, or by passing through downstream air-cooling ducts 84 (FIG. 1). The cooled finished product "P" is cut to length as it continues to travel by a cutting means 85 (FIG. 1), for example, a shearing, sawing, or similar device moving at the same speed as the product.

FIBER-BACKED BELT MOLDS

Fiber belts 37 and 38 (FIGS. 3, 4, 6, 7, and 8B) for the belt molds 34 and 36 are each made of plies of woven fibers, such as nylon, polyester, or cotton, that are commercially bonded together. Both a four-ply woven cotton hot stock and water belt, Model 47, available from Beltservice Corporation of Sacramento, Calif., and a four-ply woven polyester belt available from Sparks Belting Company of Pomona, Calif., have proven to be satisfactory fiber backing for the endless belt molds 34 and 36. Fiber belts are preferred to prior art thin metal belts because fiber belts provide a belt mold backing with true parallel edges and have no weld or camber, and they have only about one-hundredth of the thermal conductivity (K factor) as steel. Additionally, fiber belts will not dent, crimp, or rust, and are easier to store and handle.

The outer side of each of the top 37 and bottom 38 fiber belts (FIGS. 3, 4, 6, 7, and 8B) has a rough stipple or cloth surface to optimize the adherence of the respective top 39 and bottom 40 silicone rubber molds (FIGS. 3, 4, 6, 7, and 8B). The rubber silicone molds 39 and 40 may be comprised of General Electric RTV664 silicone rubber, manufactured by General Electric Company.

Another advantage of using a fiber belt instead of a thin steel belt is that the inner side of the fiber belt 37 and 38 can have a wide, flattened V-shaped ridge 41 (FIGS. 4 and 5) or other shaped ridge, or have a pair of spaced twin ridges 41 (FIGS. 6, 7, and 8B) that will fit a matching groove 42 (FIGS. 4 and 5) or grooves 42 (FIGS. 6, 7, and 8B) in the sprocket drive roll 43 (FIGS. 1, 2, 3, 4, 6, 8A, and 8B). The use of at least one flattened V-shaped ridge 41 being received by matching groove 42 in the sprocket drive roll 43 provides mechanically positive transverse (tracking or side-to-side) alignment of the belt molds 34 and 36. Thus, the fiber belts 37 and 38 are mechanically held from drifting laterally. This positive mechanical transverse alignment is not accomplished with thin metal belts as shown traveling on flat-surfaced pulleys in U.S. Pat. Nos. 4,128,369 and 4,290,248.

Figure 4:
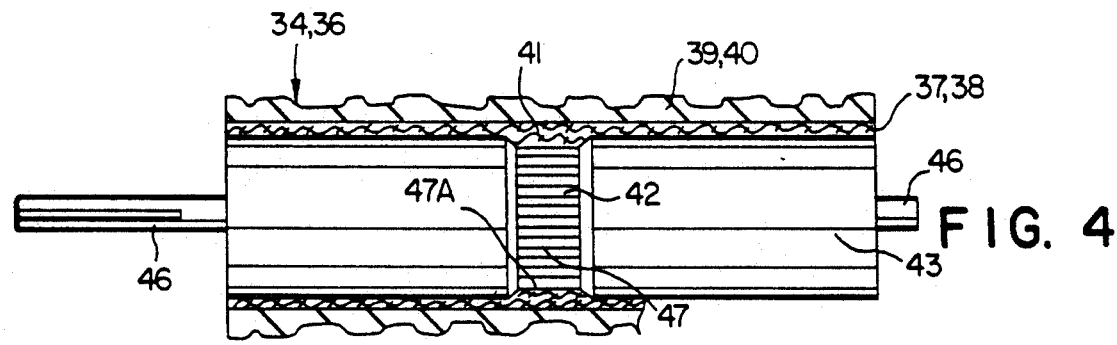
FIG. 4 is a partial cross-sectional view taken along the line 4—4 on FIG. 1 showing one of the wide drive roll sprockets
Figure 5:
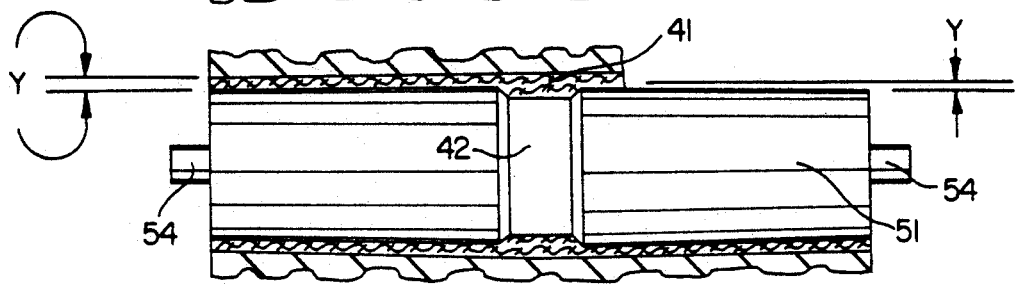
FIG. 5 is a partial cross-sectional view taken along the line 5—5 on FIG. 1 showing a crowned and grooved exit idler roll.
Figure 6:
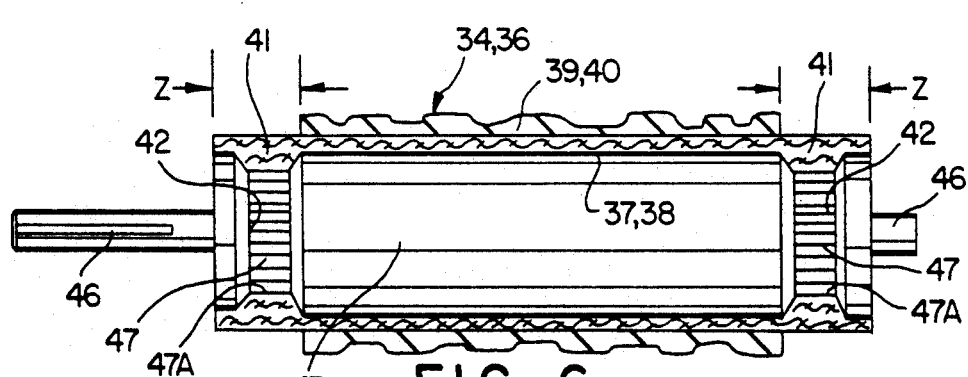
FIG. 6 is a partial cross-sectional view similar to FIG. 4 for showing a wide drive roll twin sprocket, which is an alternative to the drive roll sprocket shown in FIG. 4.

The V-shaped ridge 41 also has a gear or cog configuration 47A (FIGS. 4, 6, and 8B) that will fit a matching gear or cog configuration 47 in the groove 42 of a positive drive roll sprocket 43 (FIGS. 4, 6, and 8B). Such a groove and gear or cog arrangement eliminates belt slippage and provides forward-motion, feeding-direction alignment of the patterns on the belt molds 34 and 36. A timing chain or timing belt 44 (FIG. 8A) connecting timing gears or timing pulleys 45 (FIG. 8A) on the shafts 46 (FIGS. 8A and 8B) of the top and bottom drive roll sprockets 43 are used to maintain this forward motion alignment of the pattern 78 (FIG. 9) of the top and bottom belt molds 34 and 36 such that the patterns 78 of the top and bottom belt molds 34 and 36 move in unison from the entrance 89 (FIG. 1) to the exit 90 of the machine 30. In other words, the patterns on the two belt molds are caused to be moving forward at the same rate of travel with simultaneous, equal, synchronous forward motion.

Another advantage of using fiber belts is their ability to travel around a sprocket roll of small diameter compared to the larger diameter flat surfaced pulleys required to prevent bending-yield-stress elongation of thin metal belts. Because fiber belts may travel around a diameter as small as 6 inches, small drive roll sprockets and grooved exit rolls of 6 inches to 16 inches in diameter are used to gain space for a compact-designed and efficient air-conditioning cooling system, especially in the limited space available for cooling equipment to cool the bottom belt mold 40. The facility and convenience for changing the belt molds 39 and 40 are also improved by utilizing the added available space obtained by using fiber belts 37 and 38 and small sprocket drive rolls 43.

A further advantage of using fiber belts 37 and 38 is their low thermal conductivity that approximately matches the low thermal conductivity of the silicone rubber molds 39 and 40. For example, bonded fibers have a K factor of about 0.27 and the K factor of silicone rubber is about 0.10. By comparison, 1 percent carbon steel has a K factor of about 26, or about one hundred times more than the fiber belts. The low thermal conductivity of the fiber belt and silicone rubber mold causes the heat of the hot plastics 77 (FIGS. 2 and 8B) to be retained on and near the mold surfaces 78 for faster removal by the more efficient method of using cold, dry, moving air to directly cool these molding surfaces 78 of the belt molds. The above K factor values for the materials involved are expressed in units of Btu per hour through a square foot per degree Fahrenheit of temperature difference per foot for steel and for rubber and per inch for bonded fibers.

SPROCKET DRIVE ROLLS

The small diameter sprocket drive rolls 43 (FIGS. 1, 2, 3, 4, 5, 8A, and 8B) are between 6 inches and 16 inches in diameter. The sprocket drive roll 43 has a single, central wide recess or groove 42 (FIG. 4) or a pair of axially-spaced recesses or grooves 42 (FIGS. 6, 8A, and B), each such groove having gear or cog teeth 47 which engage with matching gear or cog teeth 47A on the ridge 41 of the fiber belt 37 or 38 resulting in a positive mechanical transverse and longitudinal alignment of the belt molds 34 and 36. The unison-forward-motion alignment, also called longitudinal alignment, is assured by connecting the shafts 46 (FIGS. 1, 2, 3, 4, 6, 8A, and 8B) of the top and bottom drive sprockets 43 with a timing chain or belt 44 (FIG. 8A).

The small diameter sprocket drive roll 43 also allows more space for mold changing and for air-conditioning equipment positioned between the floor and the pass line of the extruded material, which is normally 39 to 44 inches from the floor.

The sprocket drive rolls 43, shown in FIGS. 8A and 8B and that shown in FIG. 6, have twin-wide grooves 42 located near their opposite ends. Each of these wide grooves 42 have gear or cog teeth 47 which engage with matching gear or cog teeth 47A (FIG. 6) on the twin-wide V-shaped ridges 41 located near opposite edges of the fiber belts 37 or 38. As shown in FIGS. 6 and 8B, the twin ridges 41 are disposed near the edges of the fiber belts 37 and 38 beyond the edges of the silicone rubber molds 39 and 40. Those skilled in the art will recognize that other arrangements of the V-shaped ridges 41 are suitable. In FIG. 6 the edge of the rubber molds 39 or 40 is shown spaced inward a distance of "Z" from the edge of the fiber belt 37 or 38, and this inward spacing "Z" is greater than the overall width of each V-shaped wide ridge 41.

SPROCKET DRIVE ROLL MOTORS

The top and bottom sprocket rolls 43 are driven by a D.C. motor 48 (FIG. 8A). Sometimes a torque motor 48A and gear reducer 50A (FIG. 8A) are used to assist the drive motor. The torque motor helps to drive the load but does not override or fall behind the drive motor. This drive and torque motor arrangement 48 and 48A prevents the motors from forcing the belt molds 34 and 36 out of longitudinal alignment when two motors are used and maintains the integrity of the positive mechanical alignment between the sprocket drive rolls 43 and the geared belt molds 34 and 36. A sprocket gear 91 on the shaft of the motor 48 drives a chain 49 (FIG. 8A) for driving the sprocket gear 92 of a gear reducer 50 (FIG. 8A) connected to the shaft 46 of the bottom sprocket drive roll 43. If a torque motor 48A is used to assist the drive motor, a gearbox 50A connected to the shaft 46 of the top drive roll sprocket 43 is connected to the torque motor 48A by means of chain 49A.

This arrangement of drive 48 and torque 48A motors provides for usage of motors of less horsepower that are less expensive to purchase and operate when used with gear ratios, like 150:1, in the gear reducer 50 and 50A to achieve the necessary belt operating speeds using less energy.

GROOVED EXIT ROLLS

The grooved exit rolls 51 (FIGS. 1 and 5) disposed at the output end of machine 30 are the same diameter and length as the drive rolls 43 disposed at the input end of the apparatus, but are not motor-driven nor geared to each other. The grooved exit rolls 51 on shafts 54 (FIG. 5) are mounted to be aligned tangential to the slippery low coefficient of friction surface 59 (FIGS. 1, 2, 3, and 7) covering the backup plates 22. By mounting each grooved exit roll 51 tangential to the slippery surface 59 of the backup plate 22, open space without support is reduced between the backup plates and a product conveyor 53 (FIG. 1). The single or twin grooves 42 in the grooved exit roll 51 are smooth, without gear or cog teeth.

The grooved exit rolls 51 may or may not be crowned (dimension "Y" in FIG. 5) and provide the means to fine tune the transverse (lateral) tracking alignment of the belt molds 34 and 36. For example, in the preferred embodiment such crowning "Y" is in the range from about 1/64 inch to about 3/16 inch per foot of axial length of the exit roll 51. One end of a shaft 54 of each of the top and bottom grooved exit rolls 51 is held stationary during operation at a desired position with a self-aligning bearing 55 (FIG. 1). The desired position of this bearing 55 can be adjusted backwards and forwards, arrow 86 (FIG. 1), by a first electric jack screw (not shown), but this bearing 55 is held stationary during running of the machine 30. The other end of the shaft 54 of each grooved exit roll 51 is in a self-aligning bearing 57 (FIG. 1) that can be moved backwards and forwards by a second electric screw jack 56 (FIG. 1) along slideways 58 (FIG. 1) to increase or decrease the belt tension along one edge region, relative to the other edge region, thereby fine tuning the tracking of the belt molds as may be desired to keep the belt molds 34 and 36 aligned with each other within the tolerances required by the mold pattern. Thus, the first electric screw jack (not shown) operates to set the overall tension on each exit roll 51 and the second jack screw operates to align the longitudinal axis of each specific exit roll 51 perpendicular to the direction of travel of the molded product 52.

The product pattern is distorted (as seen by comparing FIGS. 9 and 10) if either the longitudinal alignment or transverse (lateral) alignment is not maintained.

BACKUP PLATES

Backup plates 22 (FIGS. 1, 2, 3, and 7) are comprised of steel up to 1-inch thick and are coated with a layer 59 (FIGS. 1, 2, 3, and 7) of high or ultra-high molecular weight high-density polyethylene, Teflon, or other low coefficient of friction material having good lubricity and abrasion resistance.

The metal backup plate 22 coated with a material with excellent lubricity 59 provides an even, continuous level platen for supporting and guiding the belt molds 34 and 36 (FIGS. 1, 2, 3, 4, 6, 7, 8, 9, and 10) to slide forward under a constant pressure thereby stabilizing the height, configuration, orientation, posture, and belt pressure being provided consistently along the travelling, flexible, mold channel 33.

Figure 3:
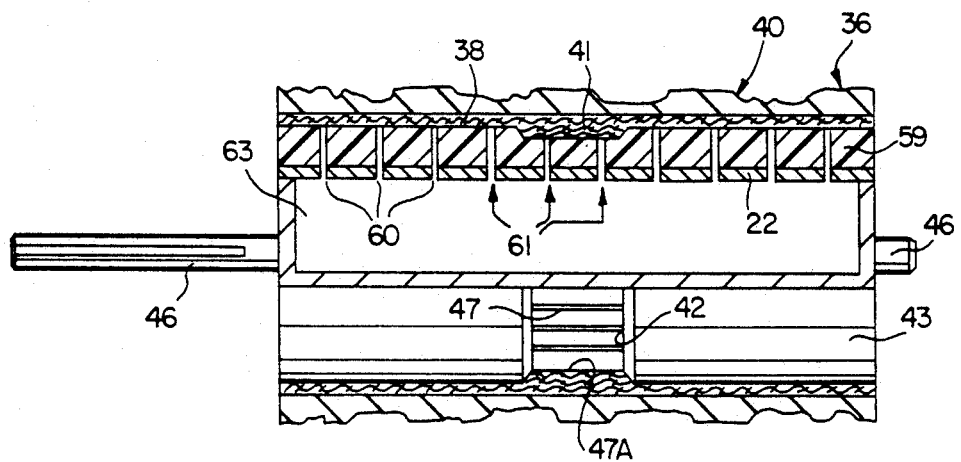
FIG. 3 is a cross-sectional view taken along the line 3—3 in FIG. 2.
Figure 7:
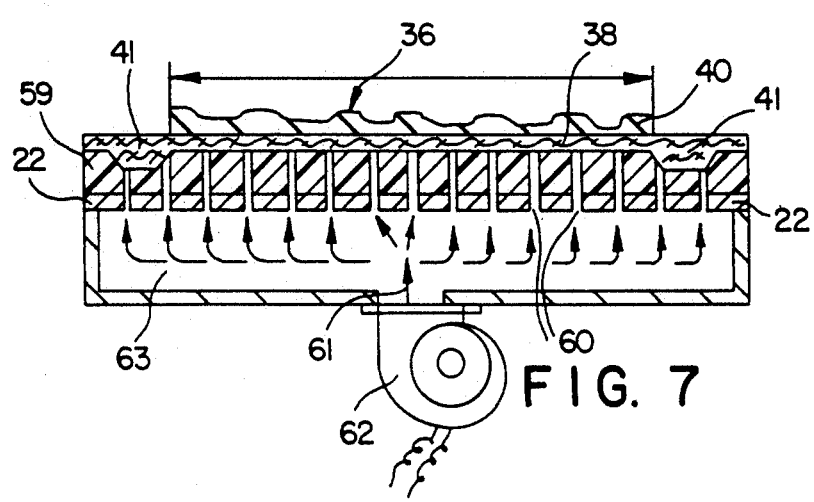
FIG. 7 is a cross-sectional view generally similar to FIG. 3 for showing an alternative twin-ridged fiber belt supported on a twin-channeled guide plate. This twin-ridged fiber belt is also seen in FIG. 6 being driven by the twin-drive sprocket shown in FIG. 6.
Figure 8A:
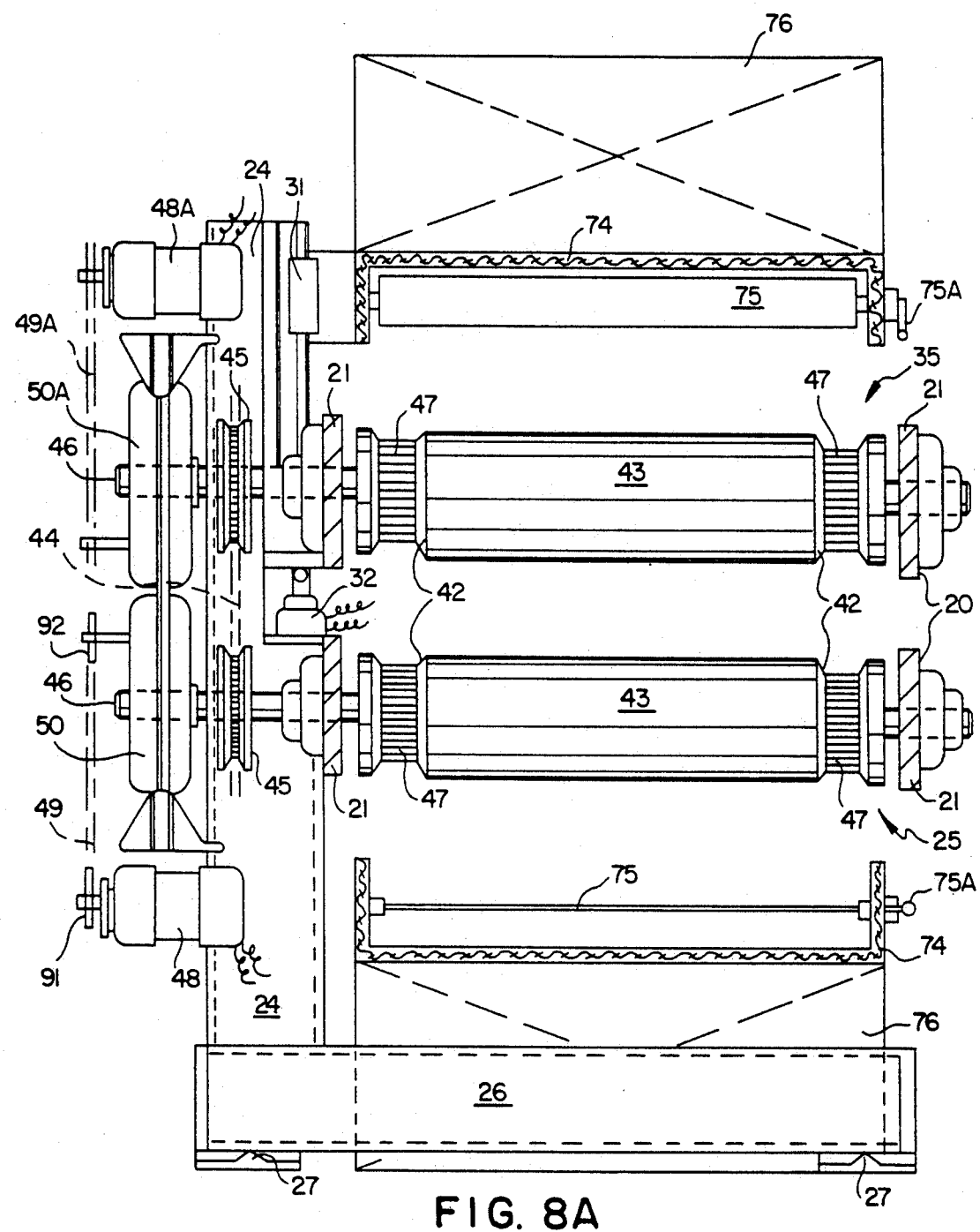
FIGS. 8A and 8B are cross-sectional views taken generally along the plane 8A—8A and 8B—8B through the apparatus of FIG. 1. (For clarity of illustration, the mold belts have been removed in FIG. 8A The belt molds are shown in section in FIG. 8B while components of the frame and drive train are omitted from FIG. 8B for clarity of illustration.)
Figure 8B:
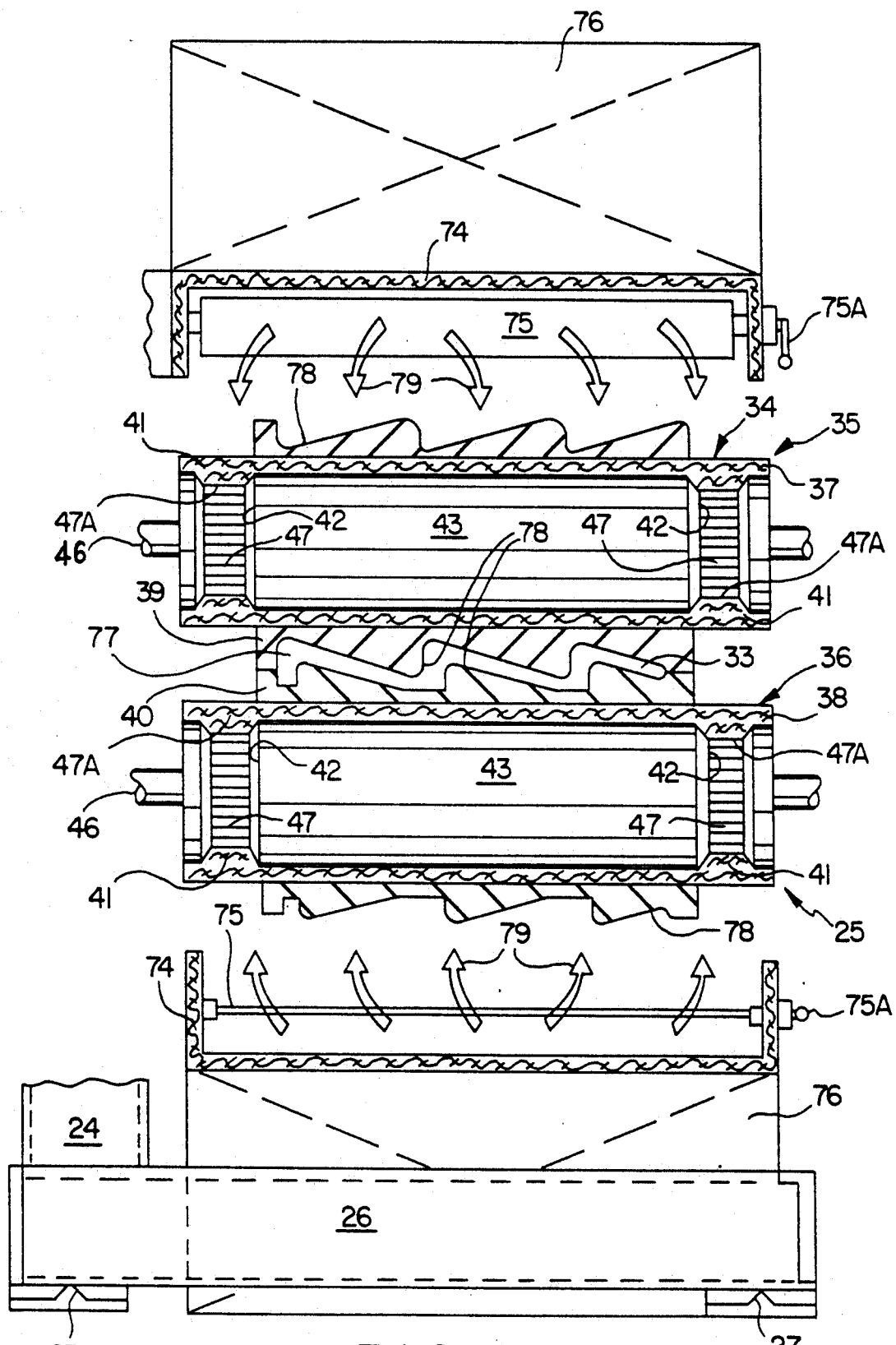

The backup plates 22 are shown drilled with a multitude of air-bearing holes 60 (FIGS. 2, 3, and 7), drilled at a 45-degree angle, aimed toward the advancing belt mold, as shown in FIG. 2, and extending through the high-density slippery backup plate coating 59 (FIGS. 2, 3, and 7).

The air-bearing holes 60 (FIGS. 2, 3, and 7) are drilled to face forward to meet the underside of the advancing fiber belts at 45 degrees, creating a friction-reducing lifting action when preferably ambient temperature high pressure air 61 (FIGS. 1, 2, 3, and 7) is forced through the holes by a blower 62 (FIGS. 1 and 7). It is believed that forming the air-bearing holes 60 at an angle of 45 degrees to the surface of the backup plate and orienting the air-bearing holes 60 such that air blows in a direction opposite the direction of the belt's travel, maximizes the friction-reducing action of the air. There is also an analogous blower (not shown) for feeding an air chamber 63 (FIG. 1) in the top carriage 35. Each blower feeds an air chamber 63 which runs the length and width of the backup plates 22 (FIGS. 1, 2, 3, and 7) in the top and bottom carriages 35 and 25.

This air-bearing system minimizes the belt mold sliding-contact pressure against the slippery coated backup plates 59 and reduces wearing of the belts and backup plate coating.

ELECTRIC SCREW JACKS

Electric screw jacks 56 (FIG. 1) and 32 (FIG. 8A) are used instead of the hydraulic equipment as is common in the art. This use of electric screw jacks saves the energy required to continuously operate a hydraulic pump and motor. Electric screw jacks only operate (and only us energy) when activated. The electrical screw jacks 56 and 32 provide a more positive and accurate movement of the machine components than hydraulic cylinders and pistons. Because of their precise positioning the movement of the machine components can be programmed to preset positions when using electric screw jacks. The need for maintenance of a hydraulic pump, hydraulic connecting hose and tubing, valves, and cylinders is eliminated. This prior art maintenance is particularly significant since these hydraulic items must be maintained in a leak-free condition to prevent contamination of the molded product. The continuous high decibel sound of a hydraulic pump is also eliminated by the use of electric screw jacks.

The primary uses of the electrical screw jacks are:
1. Raise the top carriage 35 by jack 32 (FIG. 8A) to disengage the top 34 and bottom 36 belt molds to facilitate changing the belt molds 34 and 36. the top carriage 35 by jack 32 (FIG. 8A)
2. Lower the top carrier 35 by jack 32 (FIG. 8A) to form the mold channel 33 (FIGS. 2 and 8B) for processing the resin feedstock.
3. Retract the grooved exit rolls 51 by jacks 56 (FIG. 1) to let the belt molds 34 and 36 fall loose to facilitate changing the belt molds.
4. Extend the grooved exit rolls 51 to preset positions by jacks 56 (FIG. 1) to put the belt molds 34 and 36 in tension as required for the molding operation.
5. Add extra tension to one belt mold 34 or 36 or the other to compensate for small longitudinal mismatch of mold pattern, due to one belt being slightly longer than the other This fine tuning is accomplished by adjusting the electronic controllers for the screw jacks 56 that set their stroke lengths.
6. Move the machine to and from the extruder as required to change extruder dies and to adjust the distance between the extruder die and the mold channel formed by the belt molds.

OPERATION AND FIBER BELT MOLD COOLING

In operation, as shown in FIGS. 1, 2, 8B, and 9, the continuously moving mold belts are mated and the top mold belt 34 is driven in an elongated oval path around the top carriage 35, as indicated by the arrows 87 (FIGS. 1 and 2). The bottom mold belt 36 is driven in a similar elongated oval path around the bottom carriage 25, as indicated by the arrows 88 (FIGS. 1 and 2). Thus, the mating molding surfaces 78 (FIG. 2) define a continuously moving molding channel 33 or, in some instances, more than one molding channel that provides a changing profile as desired to produce a specific product configuration. The molding channel 33 is continuously moving forward from the entry 89 (FIGS. 1 and 2) of the machine 30 to the machine exit 90 (FIG. 1).

The belt molds 34 and 36 are cooled by an air-cooling system in which conditioned, i.e. cold air (35–50 degrees Fahrenheit), is blown onto and along the molding surface 78 of the belt molds as the belts return from the exit end 90 to the entry end 89 of the machine 30 adjacent to the open side of the insulated air-conditioning ducts 74 (FIGS. 1, 8A, and 8B). The presently disclosed process and apparatus employ air cooling of the mold surfaces of the continuously moving flexible belt molds. Such dry cooling of the mold surfaces is more compatible with the heated thermoplastic materials being molded than is the us of cooling water on the reverse surfaces of thin metal belts as used in the prior art. The direction and the volume of cold air passing over the belt molds 34 and 36 are controlled by a series of hand adjustable dampers 75 (FIGS. 1, 8A, and 8B) which control the direction, angle, velocity, amount, and period during the return from the exit to the entry end of the machine 30. These dampers 75 have adjustment handles 75A (FIGS. 8A and 8B) which control the direction, angle, velocity, and amount of cold air during the return from the exit to the entry end of the machine 30. The cold air impinges the travelling hot belt molds. The dampers control the direction and angle of the cold air to blow counter to the direction the molds are travelling and at the angle and velocity that optimizes the heat exchange. The amount of cold air and when the cold air contacts the travelling hot belt mold surfaces are also controlled by the dampers. The dampers also provide the means to cool the surfaces of the hot belt molds to a consistent temperature before the belt molds again contact the hot plastic, thereby optimizing the molding conditions. In other words, it is desirable to have the temperature of the belt mold as it first encounters the hot plastic be uniform throughout a production run. The cold air in the ducts 74 is supplied by air conditioners 76 (FIGS. 1, 8A, and 8B) of sufficient cooling capacity. The objective is to remove all of the surface heat that the belt molds 34 and 36 retain from being in contact with the hot (100-600 degrees Fahrenheit) moldable plastic material before the belt molds return to the entry 89 to again contact the hot plastic.

When the hot plastic material 77 (FIGS. 2 and 8B) enters the mold channel 33 (FIGS. 2 and 8B), it is formed by the pressure of the moving top 34 and bottom 36 belt molds that are traveling around the entry drive rolls 43. Shortly after the hot plastic 77 has been formed, the cold mold surfaces 78 (35-100 degrees Fahrenheit) of the silicone rubber belt molds 39 and 40 chill the surface of the formed product in a similar manner as the mold surfaces of injection molds and extrusion dies chill the surface of the products formed by these processes. The cold rubber belt molds 39 and 40 chill the surface of the formed thermoplastic material 77 and such chilling then "sets" the exterior regions of the molded plastic in its new, formed configuration. During the time the silicone rubber belt molds 39 and 40 are in contact with the hot plastic, these belt molds pick up heat, and the mold surface 78 (FIGS. 2 and 8B) of each of the silicone rubber molds 34 and 36 becomes hot.

Because the silicone rubber molds 34 and 36 and fiber belts 37 and 38 of these belt molds 39 and 40 are poor thermal conductors, the belt molds 39 and 40 do not transfer or absorb heat readily. As a practical matter, no significant amount of the heat penetrates through the thickness of the silicone rubber during any one contact of the travelling belt molds with the hot plastic material 77. The heat retained by the belt molds is surface heat localized near the mold surfaces 78. The concentration of heat near the mold surface 78 permits the use of a more efficient cooling system of blowing cold air directly over the mold surface 78 of each belt mold to remove this surface heat and to return the mold surface 78 to a temperature of 35-100 degrees Fahrenheit before each travelling mold surface 78 again contacts the hot plastic 77.

The cold air in the ducts 74 is generated and blown by one or more commercially available air conditioners 76 of sufficient capacity; e.g., one ton to ten ton, connected to insulated ducts 74 that are as wide as the belt molds 34 and 36. The open side of each duct 74 facing the hot mold surface 78 of the belt mold returning from the exit end to the entry end of the machine 3 is controlled with dampers 75 to direct the cold air against the hot mold surface 78 as required to remove the localized surface heat from the mold surface of the belt molds. The air-conditioning units 76 are mounted near the entry end of the machine above the returning top belt mold 34 and below the returning bottom belt mold 36 with the cold air traveling, as shown by the arrow 79 (FIGS. 1 and 8B) against and opposite to the direction of travel of the moving returning belts. Since the air-conditioner chilled, dry air is generally traveling in a direction 79 counter to the direction of travel 87 and 88 of the returning mold surface 78 from which heat is being extracted, we have provided a counter-current-flow heat exchange, which we believe to be an optimum flow relationship. An exhaust cold air flow 80 (FIG. 1) from the cold air ducts 74 (FIG. 1) is directed at the top and bottom surfaces of the molded product 52 (FIG. 1) leaving the exit end of the machine 30.

As is well known, the amount of heat removed from a surface by the flow of a cooling fluid is dependent upon the velocity of the cooling fluid in relation to the heated surface. When the velocity of the flow of the cooling air 79 over the heated mold surface 78 is too low, the cooling air becomes saturated with heat and incapable of removing further heat from the heated surface prior to passing over the entire surface. When the velocity of the cooling air relative to the heated surface is too high, the air conditioners 76 and their blowers are operating at a rate which exceeds optimum efficiency because the cooling air does not remain in contact with the heated surface long enough to absorb the greatest amount of heat possible. Therefore, a most efficient relative velocity exists wherein heat transfer from the mold surface 78 to the cooling air 79 is maximized. The counter-current-flow of the present invention attempts to maximize heat transfer efficiency from the belt molds 34 and 36 to the cooling air by providing an optimal relative velocity therebetween. This optimal relative velocity is achieved by the means of adjustable dampers that cause the air to travel at a controlled velocity in a direction counter to the direction of travel of the mold surface 78.

The cooling system described is a dry cooling system which is preferred to a wet or water-cooling system in a ho plastics molding operation. The air-cooling system described here also eliminates the need for water chillers, pumps, a recirculating system, a water cleaning system, and a sump under the machine.

If the molded product 52 requires further cooling, it travels through a water bath, water spray, or through air-conditioning ducts 84 (FIG. 1). The cooled finished product "P" is cut at 85 to length, punched, slotted, painted, or has other finishing operations performed as it travels over the conveyor system 53 (FIG. 1).

Electric screw jacks 81 (FIG. 1) move the machine 30 away from the extruder 28, as shown by the arrow 82 in FIG. 1, for service and maintenance and for changing the extruder die 29. Electric screw jacks 32 (FIG. 8A)

move the top carriage up and down to change belt molds, as shown by the arrow 83 (FIG. 1).

FIG. 9 is a cross-sectional view of the complementary silicone rubber top mold 39 and silicone rubber bottom mold 40, illustrating proper alignment thereof. The continuously moving mold channel 33 forms a shape which correctly corresponds to the desired product.

FIG. 10 illustrates the effects of misalignment of the silicone rubber top mold 30 relative to the silicone rubber bottom mold 40, thus causing undesired distortion of the mold channel 33. This results in distortion of the final molded product.

It is a function of the wide V-shaped ridges 41 and the V-shaped grooves 42 as well as the crown on the grooved exit rolls to maintain proper alignment of the silicone rubber top mold 39 relative to the silicone rubber bottom mold 40 and thereby prevent misalignment of the continuously moving mold channel 33.

The above-described process and apparatus has improved methods and components to continuously produce impression-molded thermoplastic products with closer tolerances on a less costly machine. The machine is easier to maintain, uses less energy, is less expensive to operate, and makes less noise.

It is understood that the exemplary continuous molding process and apparatus described herein and shown in the drawings represents only a presently preferred embodiment of the invention. Indeed, various modifications and additions may be made to such embodiment without departing from the spirit and scope of the invention. For example, the molds may be comprised of flexible, heat-resistant materials other than silicone rubber. Also, various arrangements of ducts providing cooling air to the mold surface are possible. Thus, these and other modifications and additions may be apparent to those skilled in the art and may be implemented to adapt the present invention for use in a variety of applications.

What is claimed is:

1. A process for three-dimensional forming of thermoplastic material heated to a formable temperature comprising the steps of:
   (a) providing a first flexible belt mold with an inner side and with a first mold surface on an outer side, said first mold surface having a first three-dimensional mold pattern therein;
   (b) providing a second flexible belt mold with an inner side and with a second mold surface on an outer side, said second mold surface having a second three-dimensional mold pattern therein;
   (c) providing first and second spaced parallel longitudinally extending ridges on said inner side of said first belt mold;
   (d) providing third and fourth spaced parallel longitudinally extending ridges on said inner side of said second belt mold;
   (e) positioning said first mold surface in juxtaposition with said second mold surface with said first and second three-dimensional mold patterns being in mating relationship for defining at least one mold channel between said first and second mold surfaces;
   (f) revolving said first and second flexible belt molds for moving said mold channel from an entrance region to an exit region;
   (g) introducing heated thermoplastic material at moldable temperature into the entrance region of the moving mold channel;
   (h) forming heated thermoplastic material in said moving mold channel and removing heat therefrom for setting thermoplastic material in said moving mold channel into a formed product having a three-dimensional surface pattern exiting from the exit region of the moving mold channel;
   (i) stabilizing said first flexible belt mold along said moving mold channel by a first backup plate extending longitudinally along the inner side of said first flexible belt mold;
   (j) guiding said first flexible belt mold by first and second spaced parallel clearances extending longitudinally along said first backup plate for receiving said first and second ridges, respectively;
   (k) stabilizing said second flexible belt mold along said moving mold channel by a second backup plate extending longitudinally along the inner side of said second flexible belt mold;
   (l) guiding said second flexible belt mold by third and fourth spaced parallel clearances extending longitudinally along said second backup plate for receiving said third and fourth ridges, respectively;
   (m) introducing air between the inner side of said first flexible belt mold and said first backup plate between said first and second ridges for providing an air-bearing effect for reducing friction between the inner side of said first flexible belt mold and said first backup plate;
   (n) introducing air between the inner side of said second flexible belt mold and said second backup plate between said third and fourth ridges for providing an air-bearing effect for reducing friction between the inner side of said second flexible belt mold and said second backup plate;
   (o) blowing air onto said first mold surface for removing heat from said first mold surface as said first flexible belt mold is returning from said exit region to said entrance region; and
   (p) blowing air onto said second mold surface for removing heat from said second mold surface as said second flexible belt mold is returning from said exit region to said entrance region.

2. A process for three-dimensional forming of thermoplastic material heated to a formable temperature as recited in claim 1, including the further steps of:
   (a) introducing air between said first and second ridges and said first and second clearances for providing an air-bearing effect for reducing friction between said first and second ridges and said first and second clearances; and
   (b) introducing air between said third and fourth ridges and said third and fourth clearances for providing an air-bearing effect for reducing friction between said third and fourth ridges and said third and fourth clearances.

3. A process for three-dimensional forming of thermoplastic material heated to a formable temperature as recited in claim 2, including the further steps of:
   (a) shaping said first and second clearances as first and second grooves, respectively, extending along said first backup plate;
   (b) shaping said third and fourth clearances as third and fourth grooves, respectively, extending along said second backup plate;

(c) introducing air between said first and second ridges and said first and second clearances by introducing air into said first and second grooves through a plurality of apertures feeding air into said first and second grooves; and (d) introducing air between said third and fourth ridges and said third and fourth clearances by introducing air into said third and fourth grooves through a plurality of apertures feeding air into said third and fourth grooves.

4. A process for three-dimensional forming of thermoplastic material heated to a formable temperature as recited in claim 1, including the further steps of:

(a) providing said first and second ridges with first and second cog configurations, respectively;

(b) providing said third and fourth ridges with third and fourth cog configurations, respectively;

(c) revolving said first flexible belt mold by a first drive roll sprocket having first and second gear configurations matching respectively with said first and second cog configurations; and (d) revolving said second flexible belt mold by a second drive roll sprocket having third and fourth gear configurations matching respectively with said third and fourth cog configurations, thereby maintaining mating relationship of said first and second three-dimensional mold patterns on the first and second revolving flexible belt molds by producing simultaneous, equal forward motion of said first and second flexible belt molds.

5. A process for three-dimensional forming of thermoplastic material heated to a formable temperature recited in claim 1, including the further step of:

(a) providing said first backup plate with a first low-friction coating facing the inner surface of said first flexible belt mold;

(b) providing said second backup plate with a second low-friction coating facing the inner surface of said second flexible belt mold;

(c) introducing air between the inner side of said first flexible belt mold and said first backup plate between said first and second ridges by introducing air through a plurality of apertures extending through said first backup plate and extending through said low-friction coating, said apertures feeding air into a region adjacent to the inner side of said first flexible belt mold between said first and second ridges; and (d) introducing air between the inner side of said second flexible belt mold and said second backup plate between said third and fourth ridges by introducing air through a plurality of apertures extending through said second backup plate and extending through said low-friction coating, said apertures feeding air into a region adjacent to the inner side of said second flexible belt mold between said third and fourth ridges.

6. Apparatus for three-dimensional forming of thermoplastic material heated to a formable temperature comprising:

(a) a first flexible belt mold with an inner side and with a first mold surface on an outer side, said first mold surface having a first three-dimensional mold pattern therein;

(b) a second flexible belt mold with an inner side and with a second mold surface on an outer side, said second mold surface having a second three-dimensional mold pattern therein;

(c) first and second spaced parallel longitudinally extending ridges on said inner side of said first belt mold;

(d) third and fourth spaced parallel longitudinally extending ridges on said inner side of said second belt mold;

(e) carriage means for positioning said first mold surface in juxtaposition with said second mold surface with said first and second three-dimensional mold patterns being in mating relationship for defining at least one mold channel between said first and second mold surfaces;

(f) drive means for revolving said first and second flexible belt molds for moving said mold channel from an entrance region to an exit region;

(g) feeding means for introducing heated thermoplastic material at moldable temperature into the entrance region of the moving mold channel;

(h) the first and second three-dimensional mold patterns of said first and second mold surfaces forming heated thermoplastic material in said moving mold channel and removing heat therefrom for setting thermoplastic material in said moving mold channel into a formed product having three-dimensional surface patterns exiting from the exit region of the moving mold channel;

(i) said first flexible belt mold being stabilized along said moving mold channel by a first backup plate extending longitudinally along the inner side of said first flexible belt mold;

(j) said first flexible belt mold being guided by first and second spaced parallel clearances extending longitudinally along said first backup plate for receiving said first and second ridges, respectively;

(k) said second flexible belt mold being stabilized along said moving mold channel by a second backup plate extending longitudinally along the inner side of said second flexible belt mold;

(l) said second flexible belt mold being guided by third and fourth spaced parallel clearances extending longitudinally along said second backup plate for receiving said third and fourth ridges, respectively;

(m) air feeding means for introducing air between the inner side of said first flexible belt mold and said first backup plate between said first and second ridges for providing an air-bearing effect for reducing friction between the inner side of said first flexible belt mold and said first backup plate;

(n) air feeding means for introducing air between the inner side of said second flexible belt mold and said second backup plate between said third and fourth ridges for providing an air-bearing effect for reducing friction between the inner side of said second flexible belt mold and said second backup plate;

(o) air blowing means directing air onto said first mold surface for removing heat from said first mold surface as said first flexible belt mold is returning from said exit region to said entrance region; and (p) air blowing means directing air onto said second mold surface for removing heat from said second mold surface as said second flexible belt mold is returning from said exit region to said entrance region.

7. Apparatus for three-dimensional forming of thermoplastic material heated to a formable temperature as recited in claim 6, further comprising:

(a) means for introducing air between said first and second ridges and said first and second clearances for providing an air-bearing effect for reducing friction between said first and second ridges and said first and second clearances; and (b) means for introducing air between said third and fourth ridges and said third and fourth clearances for providing an air-bearing effect for reducing friction between said third and fourth ridges and said third and fourth clearances.

8. Apparatus for three-dimensional forming of thermoplastic material heated to a formable temperature as recited in claim 7, in which:

(a) said first and second clearances are first and second grooves, respectively, extending along said first backup plate;

(b) said third and fourth clearances are third and fourth grooves, respectively, extending along said second backup plate;

(c) air is introduced between said first and second ridges and said first and second clearances by introducing air into said first and second grooves through a plurality of apertures feeding air into said first and second grooves; and (d) air is introduced between said third and fourth ridges and said third and fourth clearances by introducing air into said third and fourth grooves through a plurality of apertures feeding air into said third and fourth grooves.

9. Apparatus for three-dimensional forming of thermoplastic material heated to a formable temperature as recited in claim 6, in which:

(a) said first and second ridges have first and second cog configurations, respectively;

(b) said third and fourth ridges have third and fourth cog configurations, respectively;

(c) said first flexible belt mold is revolved by a first drive roll sprocket having first and second gear configurations matching respectively with said first and second cog configurations; and (d) said second flexible belt mold is revolved by a second drive roll sprocket having third and fourth gear configurations matching respectively with said third and fourth cog configurations, thereby maintaining mating relationship of said first and second three-dimensional mold patterns on the first and second revolving flexible belt molds by producing simultaneous, equal forward motion of said first and second flexible belt molds.

10. Apparatus for three-dimensional forming of thermoplastic material heated to a formable temperature recited in claim 6, in which:

(a) said first backup plate has a first low-friction coating facing the inner surface of said first flexible belt mold;

(b) said second backup plate has a second low-friction coating facing the inner surface of said second flexible belt mold;

(c) air is introduced between the inner side of said first flexible belt mold and said first backup plate between said first and second ridges by a plurality of apertures extending through said first backup plate and extending through said low-friction coating feeding air into a region adjacent to the inner side of said first flexible belt mold between said first and second ridges; and (d) air is introduced between the inner side of said second flexible belt mold and said second backup plate between said third and fourth ridges by a plurality of apertures extending through said second backup plate and extending through said low-friction coating feeding air into a region adjacent to the inner side of said second flexible belt mold between said third and fourth ridges.

11. A process for three-dimensional forming of thermoplastic material heated to a formable temperature comprising the steps of:

(a) providing a first flexible fiber belt mold with an inner side and with a first mold surface on an outer side, said first mold surfaces having a first three-dimensional mold pattern therein;

(b) providing a second flexible fiber belt mold with an inner side and with a second mold surface on an outer side said second mold surface having a second three-dimensional mold pattern therein;

(c) positioning said first mold surface in juxtaposition with said second mold surface with said first and second three-dimensional mold patterns being in mating relationship for defining at least one mold channel between said first and second mold surfaces;

(d) applying tension to said first and second flexible fiber belt molds;

(e) revolving said first and second flexible fiber belt molds while in tension for moving said mold channel from an entrance region to an exit region;

(f) introducing heated thermoplastic material at moldable temperature into the entrance region of the moving mold channel;

(g) forming heated thermoplastic material in said moving mold channel and removing heat therefrom for setting thermoplastic material in said moving mold channel into a formed product having a three-dimensional surface pattern exiting from the exit region of the moving mold channel;

(h) stabilizing said first flexible fiber belt mold along said moving mold channel by a first backup plate extending longitudinally along the inner side of said first flexible belt mold;

(i) laterally guiding said first flexible fiber belt mold moving along said first backup plate;

(j) stabilizing said second flexible fiber belt mold along said moving mold channel by a second backup plate extending longitudinally along the inner side of said second flexible belt mold;

(k) laterally guiding said second flexible fiber belt mold moving along said second backup plate;

(l) introducing air between the inner side of said first flexible fiber belt mold and said first backup plate for providing an air-bearing effect for reducing friction between the inner side of said first flexible fiber belt mold and said first backup plate;

(m) introducing air between the inner side of said second flexible fiber belt mold and said second backup plate for providing an air-bearing effect for reducing friction between the inner side of said second flexible fiber belt mold and said second backup plate;

(n) applying extra tension in one revolving flexible fiber belt mold relative to tension in the other revolving flexible fiber belt mold for fine tuning the mating of said first and second three-dimensional mold patterns for compensating for small longitudinal mismatching of the first and second three-dimensional mold patterns due to a slight difference in the length of the first and second revolving flexible fiber belt molds;

(o) blowing air onto said first mold surface for removing heat from said first mold surface as said first flexible fiber belt mold is returning from said exit region to said entrance region; and (p) blowing air onto said second mold surface for removing heat from said second mold surface as said second flexible fiber belt mold is returning from said exit region to said entrance region.

12. A process for three-dimensional forming of thermoplastic material heated to a formable temperature as claimed in claim 11, including the further steps of:

(a) revolving said first flexible fiber belt mold past a first exit roll positioned near said exit region of the moving mold channel;

(b) revolving said second flexible fiber belt mold past a second exit roll positioned near said exit region of the moving mold channel;

(c) actuating a first pair of electric screw jacks for shifting said first exit roll in a direction away from said entrance region for applying tension to said first flexible fiber belt mold;

(d) actuating a second pair of electric screw jacks for shifting said second exit roll in a direction away from said entrance region for applying tension to said second flexible fiber belt mold; and (e) adjusting relative strokes of said first and second pairs of screw jacks for applying extra tension in one revolving flexible fiber belt mold relative to the other revolving flexible fiber belt mold for fine tuning the mating of said first and second three-dimensional mold patterns.

13. A process for three-dimensional forming of thermoplastic material heated to a formable temperature as claimed in claim 11, including the further steps of:

(a) controlling air blown onto said first mold surface for controllably removing heat from said first mold surface;

(b) controlling air blown onto said second mold surface for controllably removing heat from said second mold surface; and (c) regulating the air blown onto said first and second mold surfaces for producing consistent surface temperature in the first and second mold surfaces as they come into contact with heated thermoplastic material being introduced into said entrance region, said consistent surface temperature being uniform throughout a production run.

14. Apparatus for three-dimensional forming of thermoplastic material heated to a formable temperature comprising:

(a) a first flexible fiber belt mold with an inner side and with a first mold surface on an outer side, said first mold surface having a first three-dimensional mold pattern therein;

(b) a second flexible fiber belt mold with an inner side and with a second mold surface on an outer side, said second mold surface having a second three-dimensional mold pattern therein;

(c) carriage means for positioning said first mold surface in juxtaposition with said second mold surface with said first and second three-dimensional mold patterns being in mating relationship for defining at least one mold channel between said first and second mold surfaces;

(d) first and second tension applying means for applying tension respectively to said first and second flexible fiber belt molds;

(e) drive means for revolving said first and second flexible fiber belt molds while in tension for moving said mold channel from an entrance region to an exit region;

(f) heated thermoplastic feeding means for introducing heated thermoplastic material at moldable temperature into the entrance region of the moving mold channel;

(g) said first and second three-dimensional mold patterns of said first and second mold surfaces forming heated thermoplastic material in said moving mold channel and removing heat from the thermoplastic material in said moving mold channel for setting thermoplastic material in said moving mold channel into a formed product having a three-dimensional surface pattern exiting from the exit region of the moving mold channel;

(h) a first backup plate for stabilizing said first flexible belt mold along said moving mold channel, said first backup plate extending longitudinally along the inner side of said first flexible belt mold;

(i) lateral guide means for laterally guiding said first flexible fiber belt mold moving along said first backup plate;

(j) a second backup plate for stabilizing said second flexible belt mold along said moving mold channel, said second backup plate extending longitudinally along the inner side of said second flexible belt mold;

(k) lateral guide means for laterally guiding said second flexible fiber belt mold moving along said second backup plate;

(l) first air feeding means for introducing air between the inner side of said first flexible belt mold and said first backup plate for providing an air-bearing effect for reducing friction between the inner side of said first flexible fiber belt mold and said first backup plate;

(m) second air feeding means for introducing air between the inner side of said second flexible belt mold and said second backup plate for providing an air-bearing effect for reducing friction between the inner side of said second flexible fiber belt mold and said second backup plate;

(n) control means for said first and second tension applying means for applying extra tension to one revolving flexible fiber belt mold relative to tension in the other revolving flexible fiber belt mold for fine tuning the mating of said first and second three-dimensional mold patterns for compensating for small longitudinal mismatching of the first and second three-dimensional mold patterns due to a slight difference in the length of the first and second revolving flexible fiber belt molds;

(o) first air blowing means directing air onto said first mold surface for removing heat from said first mold surface as said first flexible belt mold is returning from said exit region to said entrance region; and (p) second air blowing mean directing air onto said second mold surface for removing heat from said second mold surface as said second flexible belt mold is returning from said exit region to said entrance region.

15. Apparatus for three-dimensional forming of thermoplastic material heated to a formable temperature as recited in claim 14, further comprising:
 (a) a first exit roll positioned near said exit region of the moving mold channel on which revolves said first flexible fiber belt mold ;
 (b) a second exit roll positioned near said exit region of the moving mold channel on which revolves said second flexible fiber belt mold;
 (c) said first tension applying means including a first pair of electric screw jacks coupled to opposite ends of said first exit roll for shifting said first exit roll in a direction away from said entrance region for applying tension to said first flexible fiber belt mold;
 (d) said second tension applying means including a second pair of electric screw jacks coupled to opposite ends of said second exit roll for shifting said second exit roll in a direction away from said entrance region for applying tension to said second flexible fiber belt mold; and
 (e) control means for said first and second pairs of screw jacks for adjusting relative strokes of said first and second pairs of screw jacks for applying extra tension in one revolving flexible fiber belt mold relative to the other revolving flexible fiber belt mold for fine tuning the mating of said first and second three-dimensional mold patterns.

16. Apparatus for three-dimensional forming of thermoplastic material heated to a formable temperature as recited in claim 14, further comprising:
 (a) first air control means for controlling air blown onto said first mold surface;
 (b) second air control means for controlling air blown onto said first mold surface; and
 (c) regulating means for regulating the first and second air control means for producing consistent surface temperature in the first and second mold surfaces as they come into contact with heated thermoplastic material being introduced into said entrance region, said consistent surface temperature being uniform throughout a production run.

17. Apparatus for forming products with surfaces having three-dimensional configurations from thermoplastic material heated to a formable temperature comprising:
 (a) a first flexible fiber belt mold with an inner side and with a first mold surface on an outer side, said first mold surface having a first three-dimensional mold pattern therein;
 (b) a second flexible fiber belt mold with an inner side and with a second mold surface on an outer side, said second mold surface having a second three-dimensional mold pattern therein;
 (c) carriage means for positioning said first mold surface in juxtaposition with said second mold surface with said first and second three-dimensional mold patterns being in mating relationship for defining at least one mold channel between said first and second mold surfaces;
 (d) drive means for revolving said first and second flexible fiber belt molds on said carriage means with said first and second three-dimensional mold patterns being in mating relationship for moving said mold channel from an entrance region to an exit region;
 (e) a first exit roll mounted at its opposite ends on movable bearings on said carriage means and being positioned near said exit region of the moving mold channel on which revolves said first flexible fiber belt mold;
 (f) a second exit roll mounted at its opposite ends on movable bearing on said carriage means and being positioned near said exit region of the moving mold channel on which revolves said second flexible fiber belt mold;
 (g) a first pair of screw jacks coupled to said bearings at opposite ends of said first exit roll for shifting said first exit roll in a direction away from said entrance region for applying tension to said first flexible fiber belt mold;
 (h) a second pair of screw jacks coupled to said bearings at opposite ends of said second exit roll for shifting said second exit roll in a direction away from said entrance region for applying tension to said second flexible fiber belt mold;
 (i) said drive means revolving said first and second fiber belt molds on said carriage means with said first and second fiber belt molds being in tension and with said first and second three-dimensional mold patterns being in mating relationship;
 (j) operating means for said first and second pairs of screw jacks for relatively shifting in a direction away from said entrance region said bearing means for said first and second exit rolls for applying extra tension in one revolving flexible fiber belt mold relative to tension in the other revolving flexible fiber belt mold to compensate for said other being a slightly longer belt mold for fine tuning the mating of said first and second three-dimensional mold patterns;
 (k) a first backup plate for stabilizing said first flexible belt mold along said moving channel, said first backup plate extending longitudinally along the inner side of said first flexible belt mold;
 (l) first guide means for laterally guiding said first flexible belt mold moving along said first backup plate;
 (m) a second backup plate for stabilizing said second flexible belt mold along said moving mold channel, said second backup plate extending longitudinally along the inner side of said second flexible belt mold;
 (n) second guide means for laterally guiding said second flexible belt mold moving along said second backup plate;
 (o) first air-bearing means for introducing air between the inner side of said first flexible belt mold and said first backup plate for providing an air-bearing effect for reducing friction between the inner side of said first flexible belt mold and said first backup plate;
 (p) second air-bearing means for introducing air between the inner side of said second flexible belt mold and said second backup plate for providing an air-bearing effect for reducing friction between the inner side of said second flexible belt mold and said second backup plate;
 (q) said first and second three-dimensional mold patterns of said first and second mold surfaces being for forming heated thermoplastic material in said moving mold channel and for removing heat from the thermoplastic material in said moving mold channel for setting thermoplastic material in said moving mold channel for forming a product with surfaces having three-dimensional configurations exiting from the exit region of the moving mold channel;

(r) first air directing means for directing blown air onto said first mold surface for removing heat from said first mold surface as said first flexible belt mold is returning from said exit region to said entrance region; and (s) second air directing means for directing blown air onto said second mold surface for removing heat from said second mold surface as said second flexible belt mold is returning from said exit region to said entrance region.

* * * * *